United States Patent [19]
Dussinger et al.

[11] Patent Number: 5,899,592
[45] Date of Patent: May 4, 1999

[54] CAMERA WITH FILM WINDER THAT CAN RESET CLOSING MECHANISM FOR CLOSING LIGHT LOCK OF FILM CASSETTE

[75] Inventors: Thomas E. Dussinger, Henrietta; Douglas H. Pearson, Rochester, both of N.Y.

[73] Assignee: Eastman Kodak Company, Rochester, N.Y.

[21] Appl. No.: 09/022,572

[22] Filed: Feb. 12, 1998

[51] Int. Cl.⁶ .................................................. G03B 17/26
[52] U.S. Cl. ............................................. 396/513; 396/538
[58] Field of Search ................................... 396/513, 284, 396/392, 538, 516, 518

[56] References Cited

U.S. PATENT DOCUMENTS

| | | |
|---|---|---|
| 5,231,438 | 7/1993 | Smart ....................................... 396/522 |
| 5,357,303 | 10/1994 | Wirt ......................................... 396/518 |
| 5,550,608 | 8/1996 | Smart, et al. ............................ 396/513 |
| 5,600,393 | 2/1997 | Funahashi ................................ 396/513 |
| 5,602,609 | 2/1997 | Balling ..................................... 396/538 |
| 5,614,976 | 3/1997 | Smart, et al. ............................ 396/392 |
| 5,617,169 | 4/1997 | Takaba, et al. .......................... 396/284 |
| 5,630,192 | 5/1997 | Kobayashi ............................... 396/513 |
| 5,812,890 | 9/1998 | Konishi et al. .......................... 398/538 |

*Primary Examiner*—D. Rutledge
*Attorney, Agent, or Firm*—Roger A. Fields

[57] ABSTRACT

A camera comprising a film winder rotatable in a film winding direction for winding an exposed filmstrip into a film cassette, and a closing mechanism movable to a final position to close a light lock of the film cassette and able to be reset to a starting position to be used again, is characterized in that the film winder is rotatable in a reverse direction which is opposite to the film winding direction, and a resetting device coupled with the film winder resets the closing mechanism from its final position to its starting position when the film winder is rotated in the reverse direction.

6 Claims, 10 Drawing Sheets

5,899,592

CAMERA WITH FILM WINDER THAT CAN RESET CLOSING MECHANISM FOR CLOSING LIGHT LOCK OF FILM CASSETTE

FIELD THE INVENTION

The invention relates generally to the field of photography, and in particular to cameras. More specifically, the invention relates to a camera with a film winder that operates a closing mechanism to close a light lock of a film cassette and can reset the closing mechanism when the light lock is closed.

BACKGROUND OF THE INVENTION

Commonly assigned prior art U.S. Pat. No. 5,614,976 issued Mar. 25, 1997 discloses a one-time-use camera for use with a film cassette having a light lock that is to be closed after an exposed filmstrip is wound completely into the cassette. The light lock is closed to prevent ambient light from entering the film cassette when the cassette is removed from the camera. The camera includes a manual film winder rotatable in a film winding direction to wind the exposed filmstrip into the film cassette, and a closing mechanism movable to a final position to close the light lock when the film winder is rotated to complete winding the exposed filmstrip into the cassette. The closing mechanism appears to be resettable to a starting position to be used again. However, one must move the closing mechanism manually from its final position at least towards its starting position in order that the closing mechanism can be moved to its starting position.

SUMMARY OF THE INVENTION

A camera comprising a film winder rotatable in a film winding direction for winding an exposed filmstrip into a film cassette, and a closing mechanism movable to a final position to close a light lock of the film cassette and able to be reset to a starting position to be used again, is characterized in that:

the film winder is rotatable in a reverse direction which is opposite to the film winding direction; and a resetting device coupled with the film winder resets the closing mechanism from its final position to its starting position when the film winder is rotated in the reverse direction.

DETAILED DESCRIPTION OF THE INVENTION

The invention is disclosed as being embodied preferably in a onetime-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Film Cassette

Figure 1:
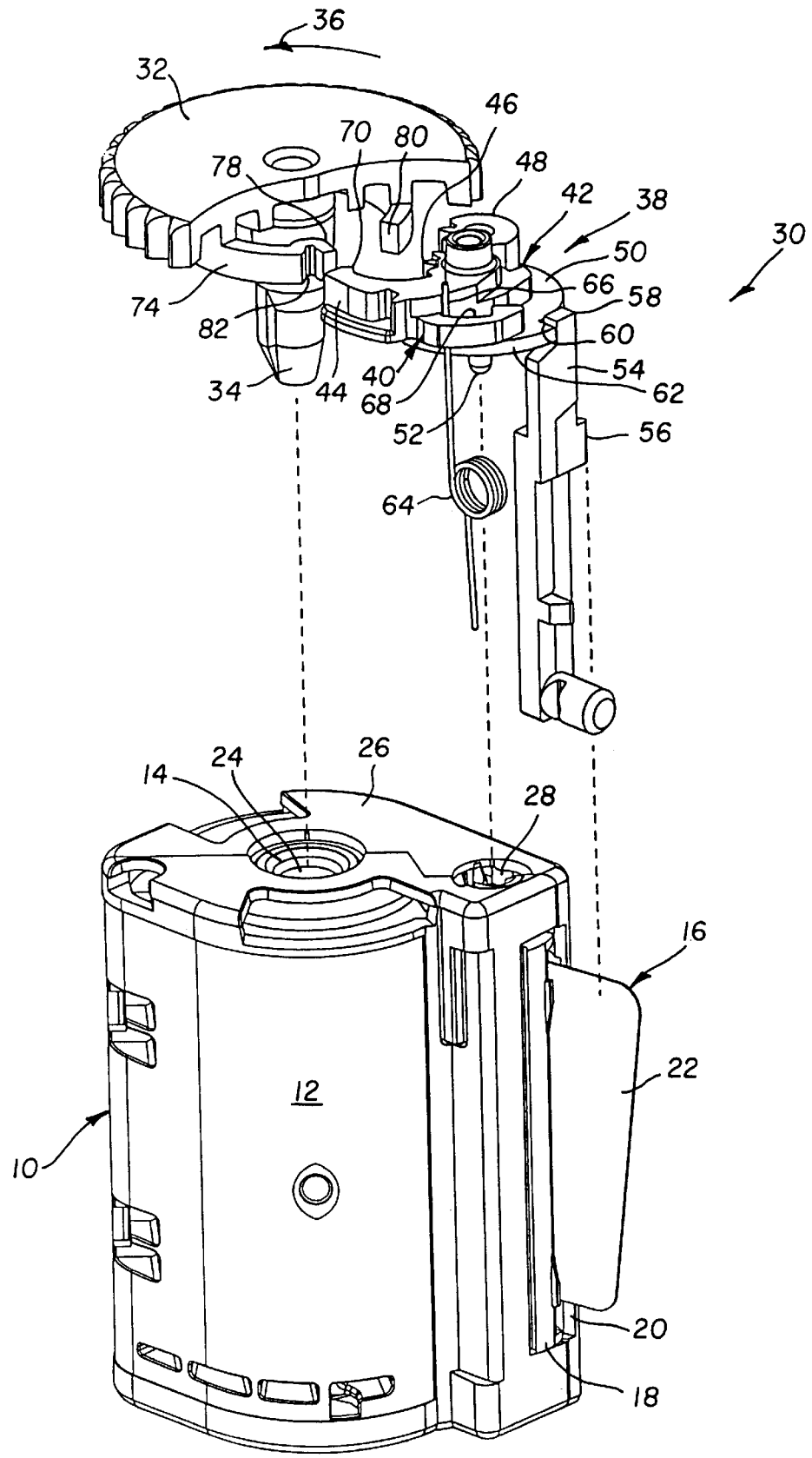
FIG. 1 is an exploded perspective view of a partially shown onetime-use camera for use with a film cassette, according to a preferred embodiment of the invention.
Figure 2:
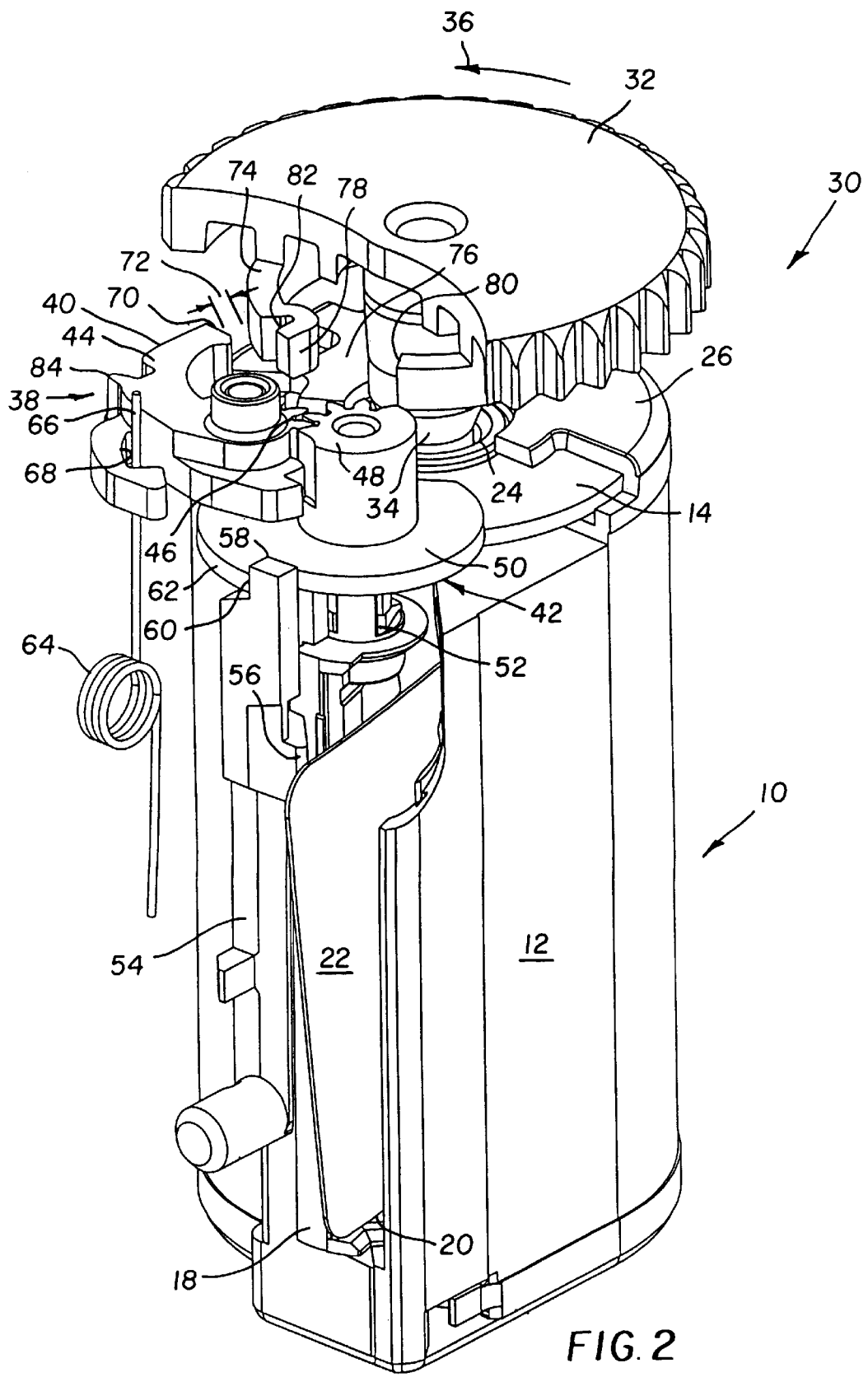
FIGS. 2, 3, 4, 5 and 6 are assembled perspective views of the partially shown camera with the film cassette as seen from an opposite side, depicting operation of a film winder and a closing mechanism for closing a light lock of the cassette.

Referring now to the drawings, FIGS. 1 and 2 show a film cassette 10 similar in operation to ones disclosed in prior art U.S. Pat. No. 5,357,303, issued Oct. 18, 1994, and U.S. Pat. No. 5,231,438, issued Jul. 27, 1993. The film cassette 10 has a cassette shell 12 that contains a flanged spool 14 on which is stored a wound unexposed/exposed filmstrip 16. A slightly elastic light lock 18 is supported within a film egress/ingress slot 20 in the cassette shell 12 to be pivoted open to permit film movement out of and back into the shell, through the slot, and to be pivoted closed to prevent ambient light from entering the shell, through the slot.

Figure 6:
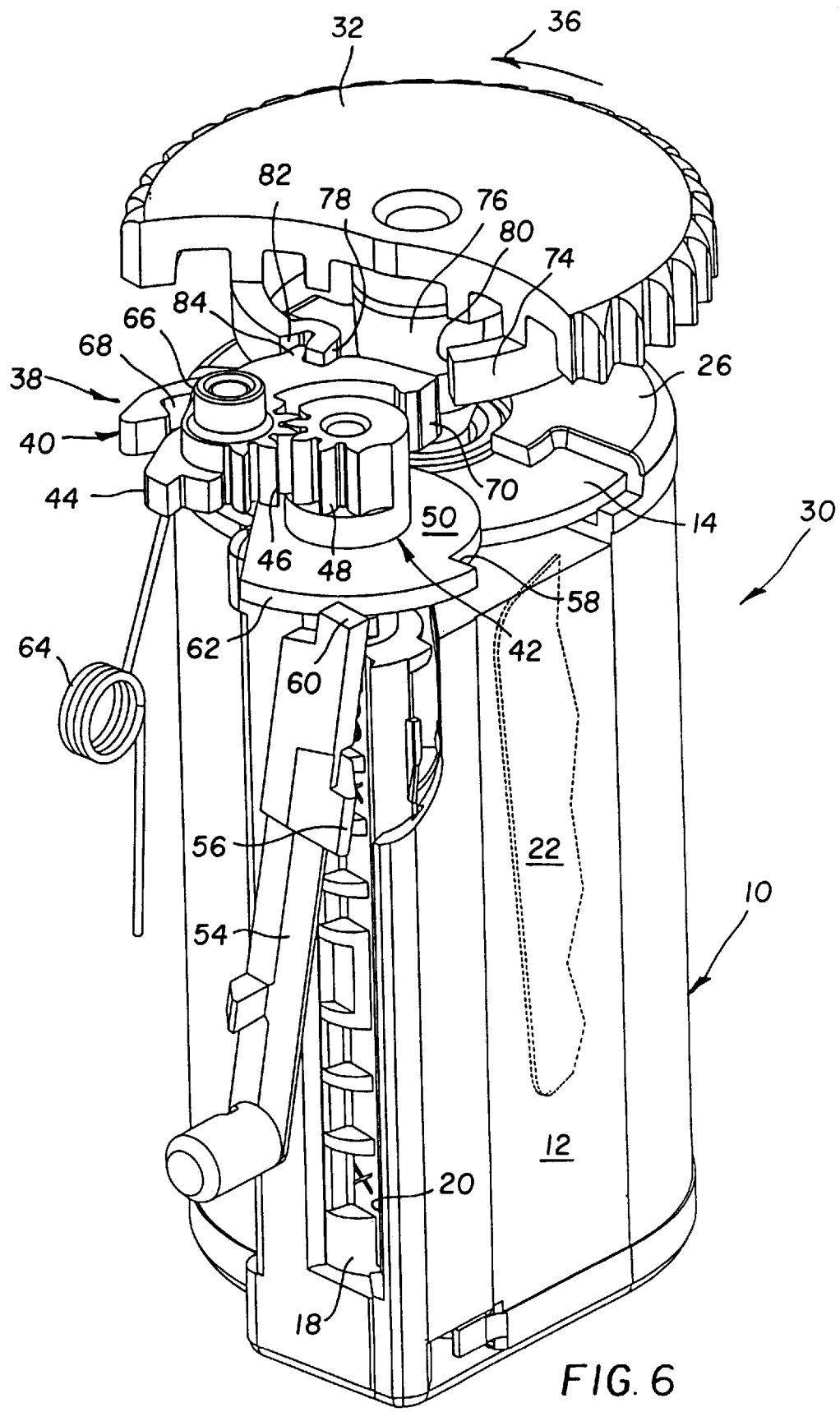

FIGS. 1 and 2 show the film cassette 10 from opposite sides, with the light lock 18 open. The filmstrip 16 except for a trailing end portion 22 has been wound into the cassette shell 12 after being exposed outside the cassette shell. FIG. 6 shows the trailing film end portion 22 wound into the cassette shell 12 and the light lock 18 pivoted completely closed.

The spool 14 has a coaxial drive cavity 24 accessible at a drive end 26 of the cassette shell 12 and the light lock 18 has a coaxial drive cavity 28 accessible at the same end of the cassette shell as shown in FIG. 1.

Camera

A partially shown camera 30 with which the film cassette 10 is to be used is shown in FIGS. 1–10.

A manual film winder or thumbwheel 32 has an integral coaxial depending drive stem 34 located within the drive cavity 24 of the spool 14 and in rotational engagement with the spool. See FIG. 1. The thumbwheel 32 is manually rotated in a film winding direction 36 to similarly rotate the spool 14 in order to wind the filmstrip 16 including the trailing film end portion 22 into the cassette shell 12.

Figure 10:
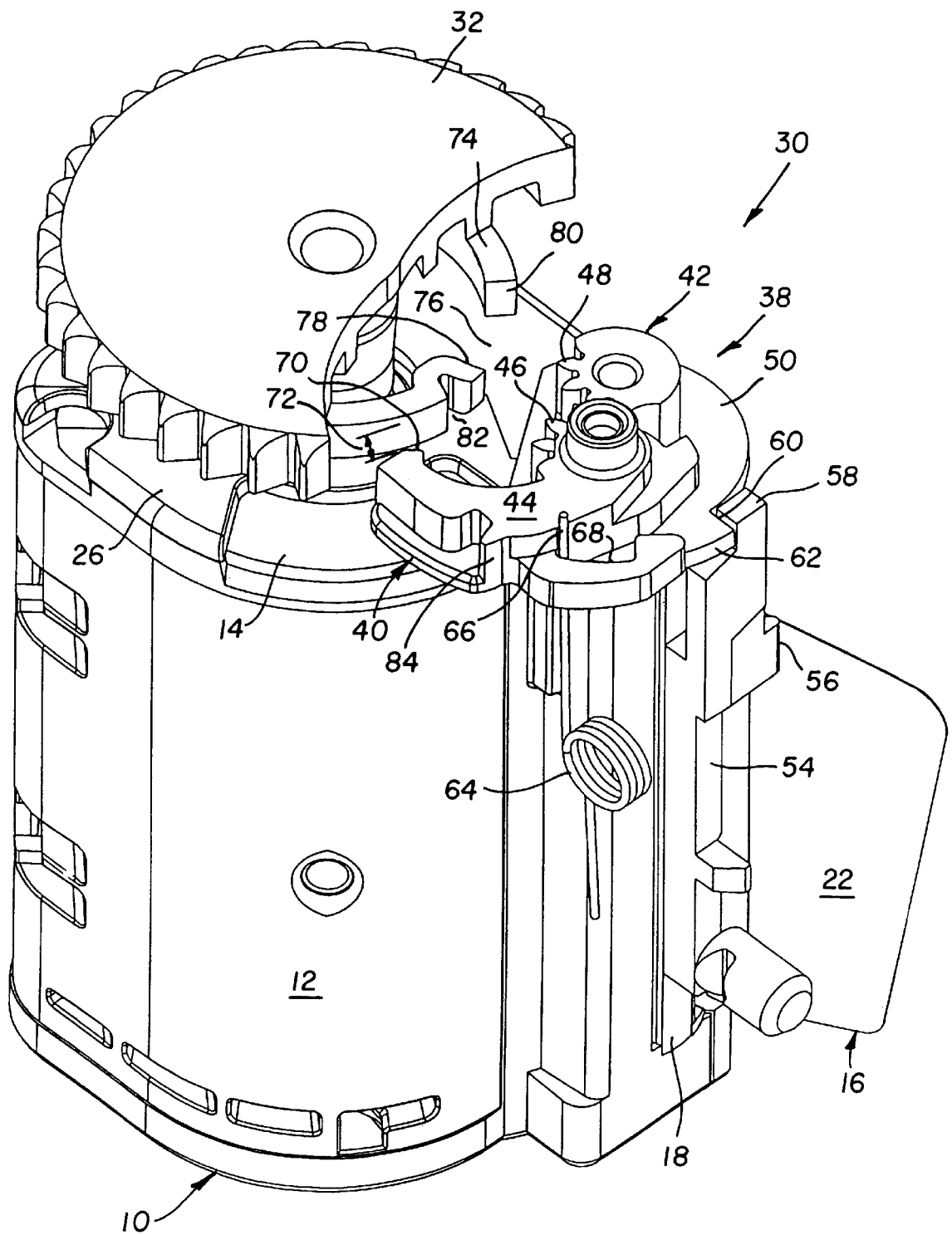
FIG. 10 is an assembled partial perspective view of the partially shown camera with the film cassette similar to FIG. 2.

As shown in FIGS. 1, 2 and 10 a closing mechanism 38 for pivoting the light lock 18 closed after the trailing film end portion 22 is wound into the cassette shell 12 comprises two single-piece closing units 40 and 42. The first single-piece closing unit 40 includes a pivotable double-arm closing lever 44 and an integral rotatable spur gear 46. The second one-piece closing unit 42 includes a rotatable spur gear 48 continuously in mesh with the first spur gear 46, an integral coaxial sector disk 50 and an integral coaxial depending drive stem 52 located within the drive cavity 28 of the light lock 18 and in rotational engagement with the light lock. Pivoting the closing lever 44 in a clockwise direction in FIGS. 1, 2 and 10 rotates the first spur gear 46 in the same direction in FIGS. 1, 2 and 10 and, thus, rotates the second spur gear 48, the sector disk 50 and the drive stem 52 in an opposite (counter-clockwise) direction in FIGS. 1, 2 and 10 to pivot the light lock closed. The two spur gears 46 and 48 are continuously spaced from the thumbwheel 32.

A pivotable film sensor lever 54 has a sensor head 56 in contact with the filmstrip 16 as the filmstrip is wound into the cassette shell 12. FIGS. 1, 2 and 10 show the sensor head 56 in contact with the trailing film end portion 22. A top projection 58 of the film sensor lever 54 is located in FIGS. 1, 2 and 10 against a relatively short radial section 60 of a peripheral edge 62 of the sector disk 50.

A double-leg torsion spring 64 has a leg end portion 66 movably arranged within an elongate crotch 68 of the closing lever 44. The spring leg end portion 66 urges the closing lever 44 to pivot in a clockwise direction in FIGS. 1, 2 and 10 to rotate the first spur gear 46 in the same direction in FIGS. 1, 2 and 10 and, thus, rotate the second spur gear 48 and the sector disk 50 in an opposite (counter-clockwise) direction in FIGS. 1, 2 and 10 to, in turn, pivot the film sensor lever 54 in a clockwise direction in FIGS. 1, 2 and 10 and bias the sensor head 56 against the filmstrip 16 including the trailing film end portion 22. Film resistance at the sensor head 56 is greater than the force of the spring leg end portion 66. As a result, the spring leg end portion 66 is prevented from urging the closing lever 44 to pivot in a clockwise direction in FIGS. 1, 2 and 10 and, instead, an end portion 70 of the closing lever is held spaced a slight distance 72 from an arcuate rib 74 fixed on the underside of the thumbwheel 32.

Operation

Figure 3:
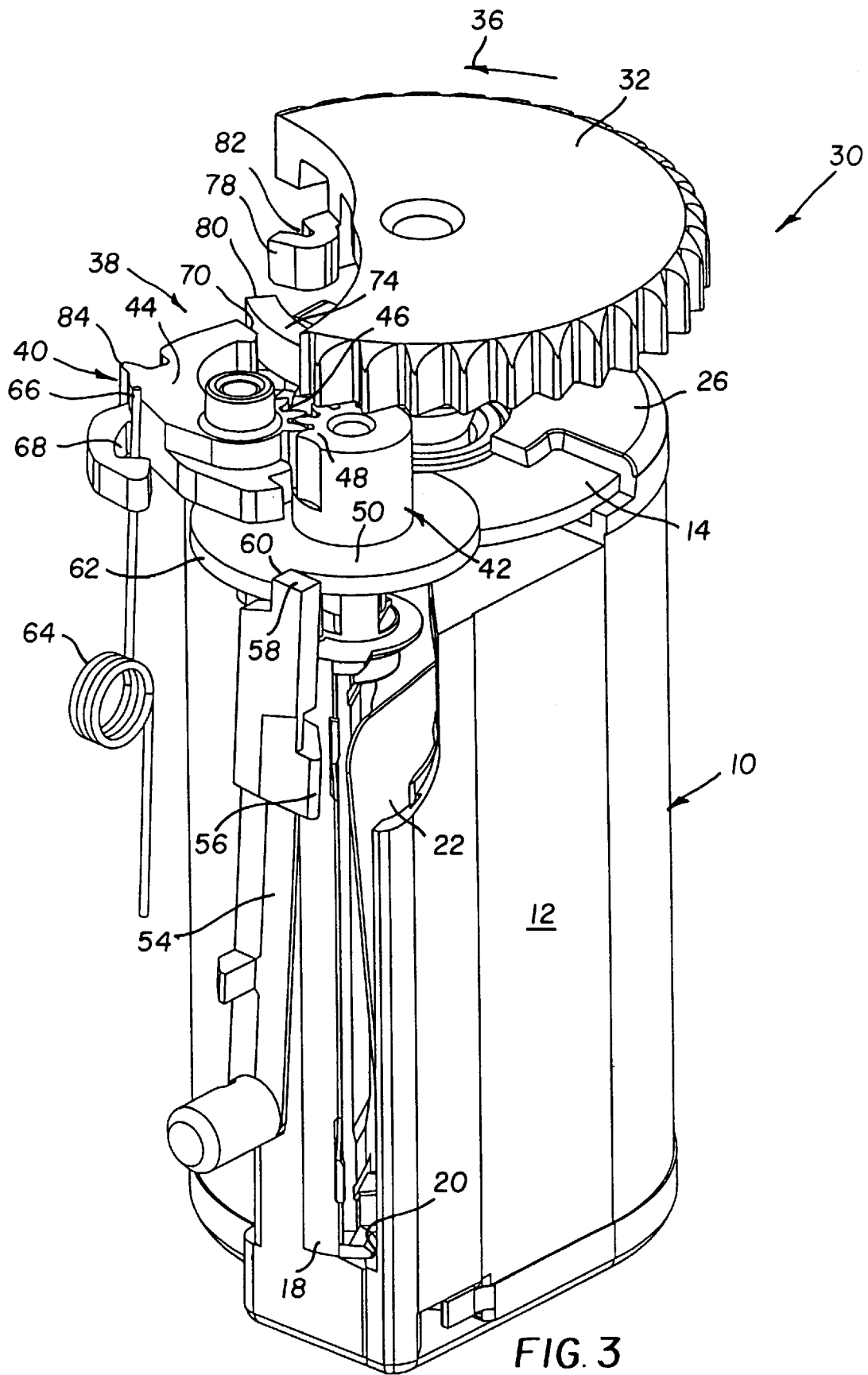

Going from FIG. 2 to FIG. 3, when the thumbwheel 32 is rotated in the film winding direction 36 the trailing film end portion 22 is drawn from the sensor head 56 of the film sensor lever 54 and into the slot 20 in the cassette shell 12. Once the trailing film end portion 22 is moved clear of the sensor head 56 the resulting absence of film resistance at the sensor head allows the spring leg end portion 66 to pivot the closing lever 44 and rotate the first spur gear 46 clockwise in FIG. 3 until the end portion 70 of the closing lever abuts the arcuate rib 74 on the thumbwheel 32. Consequently, the second spur gear 48, the sector disk 50 and the drive stem 52 are rotated counter-clockwise in FIG. 3 to pivot the film sensor lever 54 clockwise in FIG. 3, beginning at its top projection 58, and to pivot the light lock 18 initially closed part-way.

Figure 4:
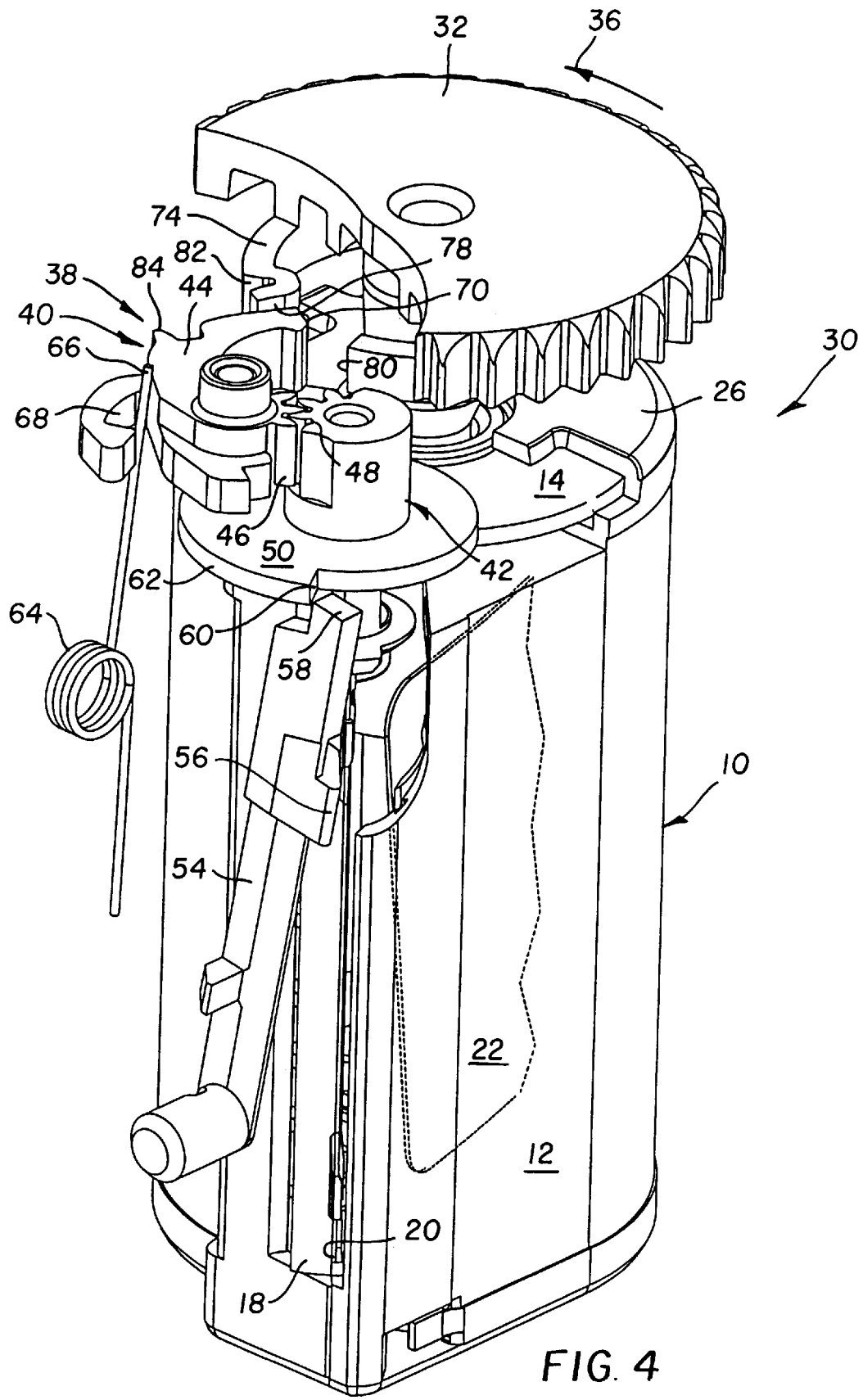

In FIG. 4, the thumbwheel 32 is rotated further in the film winding direction 36 than in FIG. 3 to draw the trailing film end portion 22 from the slot 20 and into the interior of the cassette shell 12 and to position a gap 76 in the arcuate rib 74 opposite the end portion 70 of the closing lever 44. The presence of the gap 76 opposite the end portion 70 of the closing lever 44 allows the spring leg end portion 66 to pivot the closing lever and rotate the first spur gear 46 clockwise in FIG. 4 until the lever end portion is received in the gap. Consequently, the second spur gear 48, the sector disk 50 and the drive stem 52 are rotated counter-clockwise in FIG. 4 to pivot the film sensor lever 54 further clockwise in FIG. 4 and to pivot the light lock 18 further closed.

Figure 5:
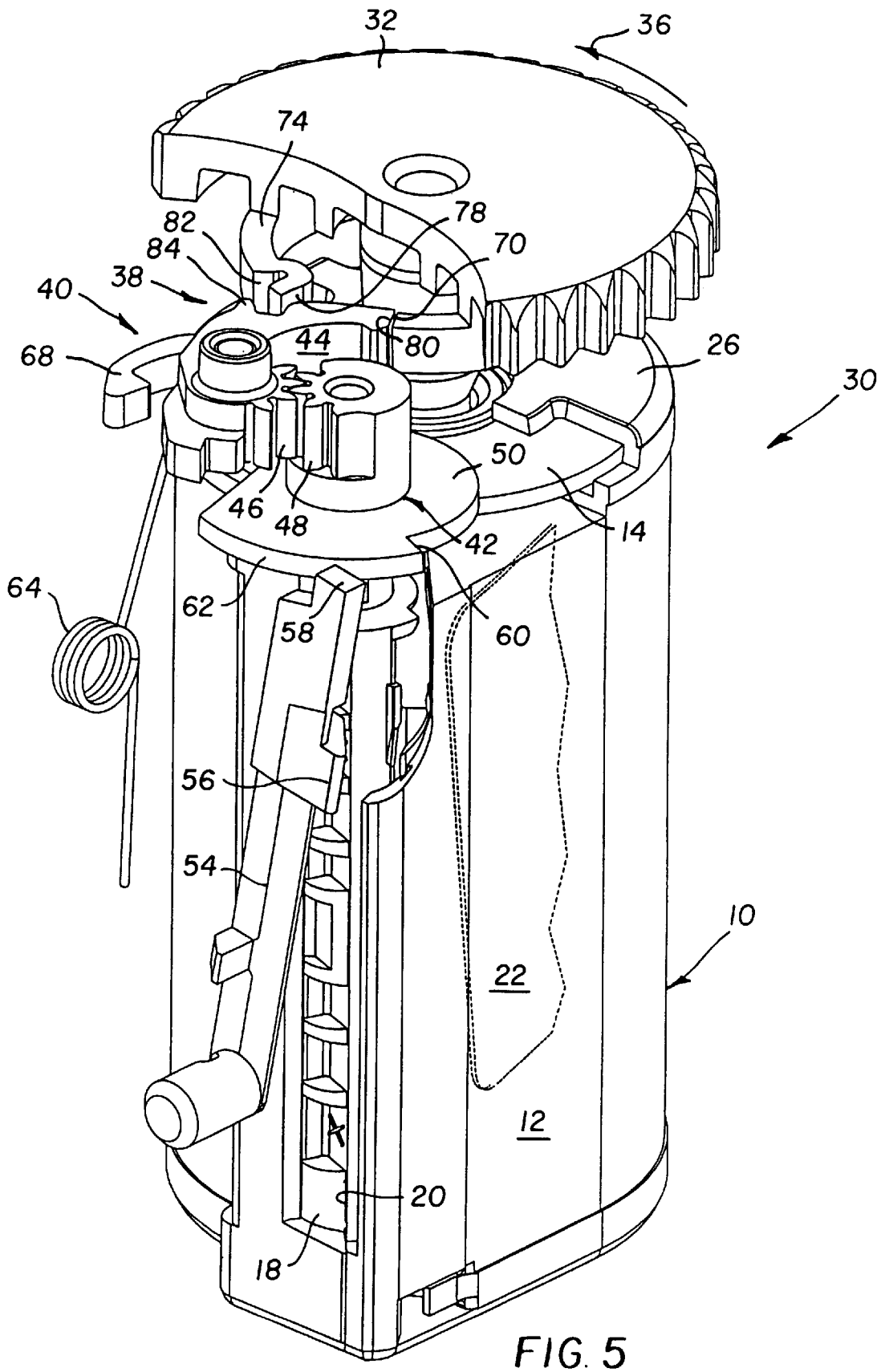

In FIG. 5, the thumbwheel 32 is rotated further in the film winding direction 36 than in FIG. 4 to draw the trailing film end portion 22 further into the interior of the cassette shell 12 and to make one end portion 78 of the arcuate rib 74 pivot the closing lever 44, beginning at the lever end portion 70, and rotate the first spur gear 46 clockwise in FIG. 4 until the lever end portion almost abuts another end portion 80 of the arcuate rib. Consequently, the second spur gear 48, the sector disk 50 and the drive stem 52 are rotated counter-clockwise in FIG. 5 to swing the radial section 60 of the peripheral edge 62 of the sector disk beyond the top projection 58 of the film sensor lever 54, leaving the film sensor lever substantially in place against the peripheral edge, and to pivot the light lock 18 further closed. At this time, the spring leg end portion 66, though remaining in the crotch 68 of the closing lever 44, ceases to exert a turning force on the closing lever. When the lever end portion 70 almost abuts the rib end portion 80 as shown in FIG. 4, a notch 82 in the arcuate rib 74 is positioned opposite a tooth 84 on the closing lever 44.

In FIG. 6, the thumbwheel 32 is rotated further in the film winding direction 36 than in FIG. 5 to draw the trailing film end portion 22 further into the interior of the cassette shell 12 and to make the end portion 78 of the arcuate rib 74 pivot the closing lever 44 clockwise in FIG. 6 to move the end portion 70 of the closing lever out of the gap 76 and to similarly rotate the first spur gear 46. Consequently, the second spur gear 48, the sector disk 50 and the drive stem 52 are rotated counter-clockwise in FIG. 6 to rotate the peripheral edge 62 of the sector disk further alongside the top projection 58 of the film sensor lever 54, leaving the film sensor lever in place, and to pivot the light lock 18 completely closed. The spring leg end portion 66, though remaining in the crotch 68 of the closing lever 44, does not exert any turning force on the closing lever. At the same time, the notch 82 in the arcuate rib 74 receives the tooth 84 on the closing lever 44 to prevent any further rotation of the thumbwheel 32 in the film winding direction 36.

Figure 7:
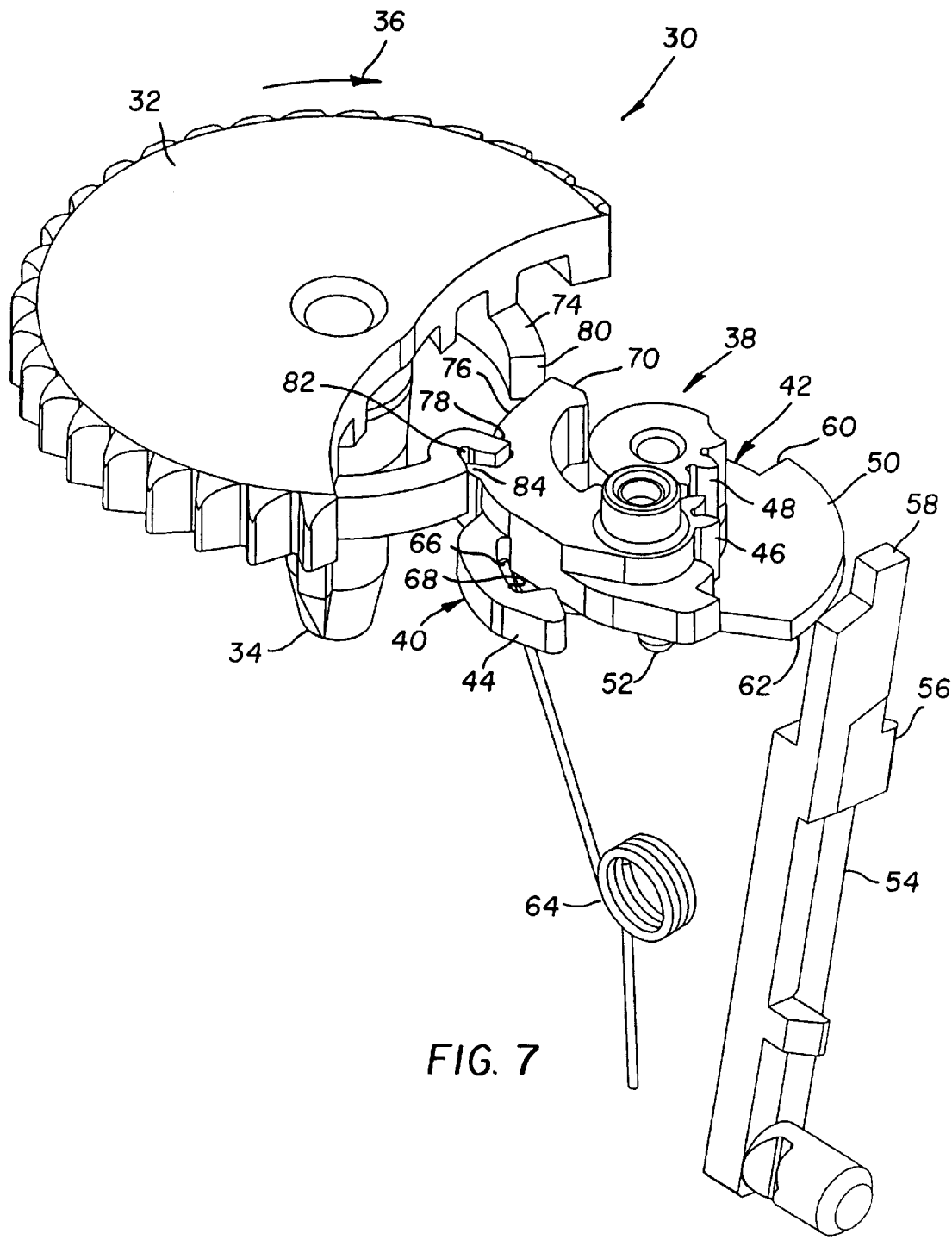
FIGS. 7, 8 and 9 are assembled partial perspective views of the partially shown camera without the film cassette as seen from the same side as in FIG. 1, depicting operation of a resetting device for the closing mechanism.

FIG. 7 is similar to FIG. 6 except that the film cassette 10 is removed.

Figure 8:
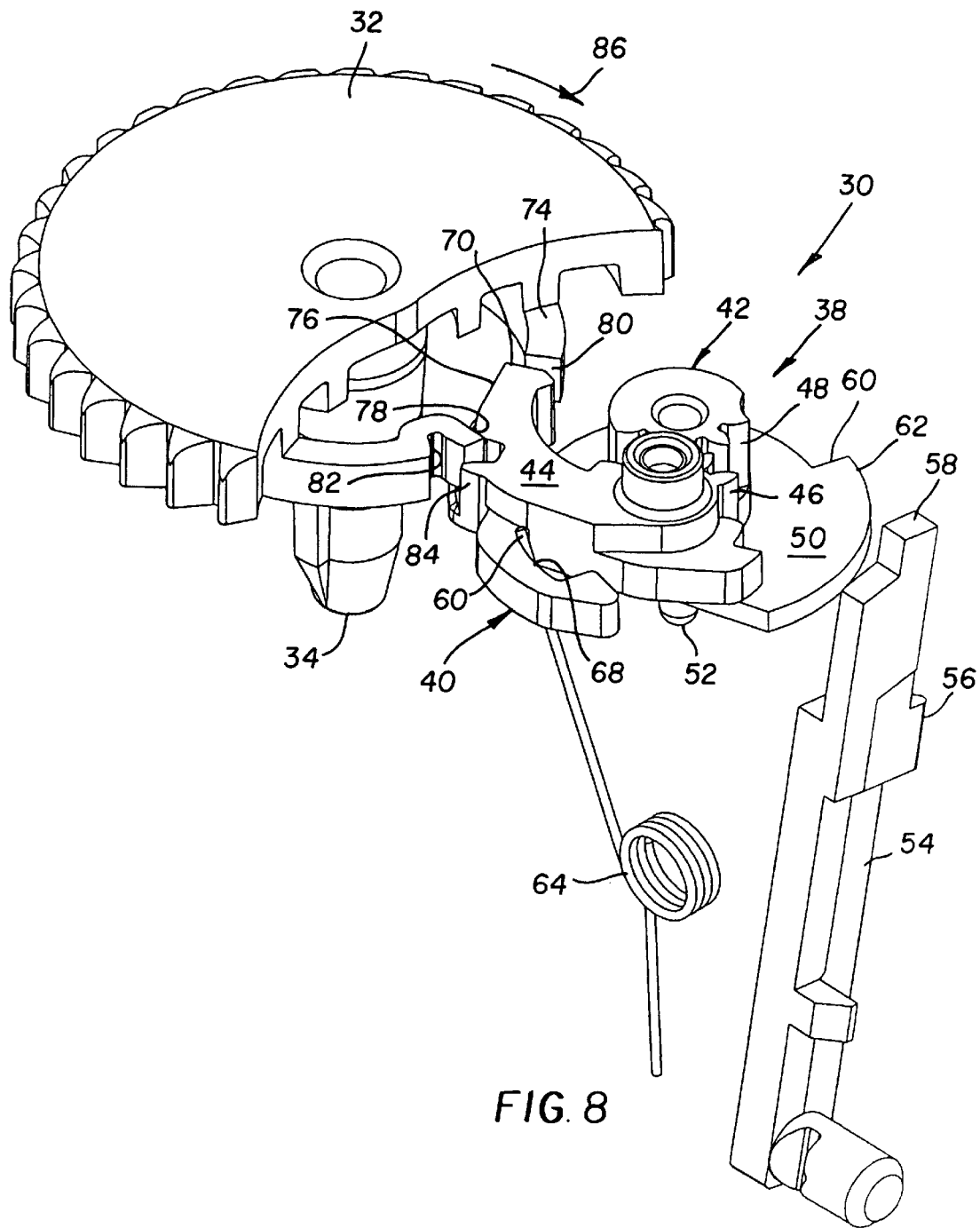
Figure 9:
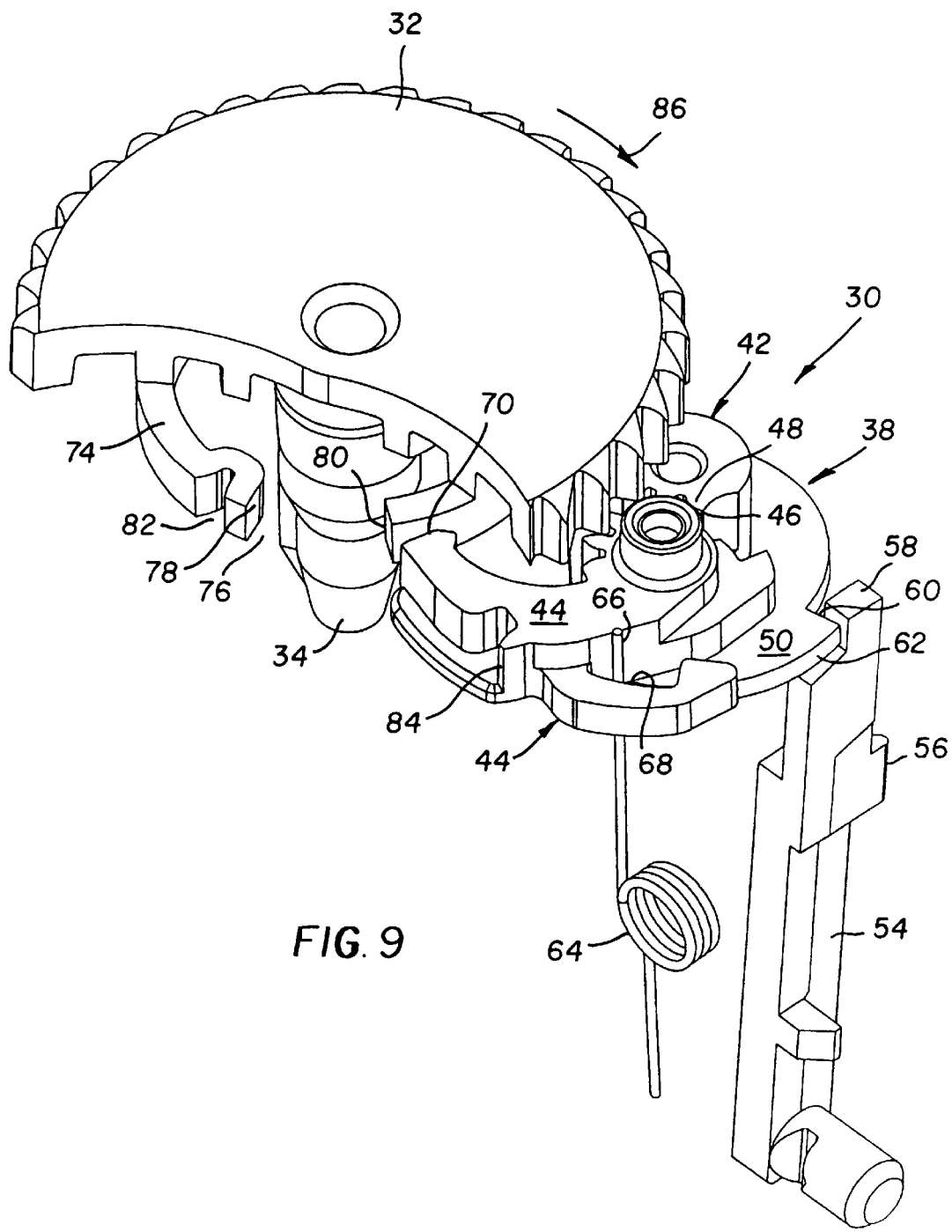

In FIGS. 8–9, an anti-backup pawl (not shown) is first disengaged from the thumbwheel 32 and then the thumbwheel 32 is rotated in a reverse direction 86 which is opposite to the film winding direction 36. In this instance, the engaged notch 82 in the arcuate rib 74 and tooth 84 on the closing lever 44 cooperate to pivot the closing lever and rotate the first spur gear 46 counterclockwise in FIG. 8 until the lever end portion 70 is returned to the gap 76 in the arcuate rib 74 and faces the end portion 80 of the arcuate rib. See FIG. 8. Then, the end portion 80 of the arcuate rib 74 pushes the end portion 70 of the closing lever 44 out of the gap 76 to further pivot the closing lever and rotate the first spur gear 46 counter-clockwise in FIG, 9. Consequently, the second spur gear 48, the sector disk 50 and the drive stem 52 are rotated clockwise in FIGS. 8 and 9 to rotate the peripheral edge 62 of the sector disk alongside the top projection 58 of the film sensor lever 54 until the radial section 60 of the peripheral edge is returned to the its position shown in FIG. 2. Then, the film sensor lever 54 is manually pivoted counter-clockwise in FIG. 9 to move its top projection 58 to against the radial section 60 of the peripheral edge 62 of the closing lever 44. The spring leg end portion 66 begins to re-exert its turning force on the closing lever 44 in FIG. 8.

FIG. 10 is similar to FIG. 2.

The invention has been described with reference to a preferred embodiment. However, it will be appreciated that variations and modifications can be effected by a person of ordinary skill in the art without departing from the scope of the invention.

PARTS LIST 10. film cassette
12. cassette shell
14. flanged spool
16. filmstrip
18. light lock
20. film egress/ingress slot
22. trailing film end portion
24. drive cavity
26. drive end
28. drive cavity
30. camera
32. manual film winder or thumbwheel 34. drive stem
36. film winding direction
38. closing mechanism
40. single-piece closing unit
42. single-piece closing unit
44. double-arm closing lever
46. first spur gear
48. second rotatable spur gear
50. sector disk
52. drive stem
54. film sensor lever
56. sensor head
58. top projection of film sensor lever 54
60. radial section
62. peripheral edge
64. double-leg torsion spring
66. leg end portion
68. crotch
70. end portion of closing lever
72. slight distance
74. arcuate rib
76. gap
78. end portion of rib
80. end portion of rib
82. notch
84. tooth
86. reverse direction

What is claimed is:

1. A camera comprising a film winder rotatable in a film winding direction for winding an exposed filmstrip into a film cassette, and a closing mechanism movable to a final position to close a light lock of the film cassette and able to be reset to a starting position to be used again, is characterized in that:

said film winder is rotatable in a reverse direction which is opposite to the film winding direction; and a resetting device coupled with said film winder resets said closing mechanism from its final position to its starting position when the film winder is rotated in the reverse direction.

2. A camera comprising a manual film winder rotatable in a film winding direction for winding an exposed filmstrip into a film cassette, and a closing mechanism movable to a final position to close a light lock of the film cassette when said film winder is rotated to complete winding the exposed filmstrip into the cassette and resettable to a starting position to be used again, is characterized in that:

said film winder is rotatable in a reverse direction which is opposite to the film winding direction; and a resetting device movable with said film winder moves said closing mechanism from its final position to its starting position when the film winder is rotated in the reverse direction.

3. A camera as recited in claim 2, wherein said closing mechanism and said film winder have mutually engageable parts that engage one another when the closing mechanism is in its final position in order to prevent rotation of the film winder in the film winding direction, but that allow rotation of said film winder in the reverse direction for said resetting device to move said closing mechanism from its final position to its starting position.

4. A camera as recited in claim 3, wherein said mutually engageable parts when engaging one another are constructed to move said closing mechanism from its final position into an immediate direct path of said resetting device when said film winder is rotated in the reverse direction.

5. A camera as recited in claim 2, wherein an actuator part movable with said film winder moves said closing mechanism from its final position into a direct path of said resetting device when the film winder is initially rotated in the reverse direction in order to allow further rotation of the film winder in the reverse direction to make said resetting device move said closing mechanism from its final position to its starting position.

6. A camera as recited in claim 5, wherein an arcuate rib having a gap is located on said film winder and includes said resetting device at one side of said gap and said actuator part proximate an opposite side of the gap to move said closing device into the gap to be in the direct path of the resetting device.

* * * * *